June 18, 1968 J. A. COTNER 3,389,234

ACCESS CONTROL IN TELEPHONE TESTING SYSTEMS

Filed May 27, 1965 5 Sheets-Sheet 1

INVENTOR
J. A. COTNER
BY R. O. Nimz
ATTORNEY

ACCESS CONTROL IN TELEPHONE TESTING SYSTEMS

Filed May 27, 1965 5 Sheets-Sheet 2

June 18, 1968 J. A. COTNER 3,389,234
ACCESS CONTROL IN TELEPHONE TESTING SYSTEMS
Filed May 27, 1965 5 Sheets-Sheet 5
FIG. 5 FAR END TEST CIRCUIT
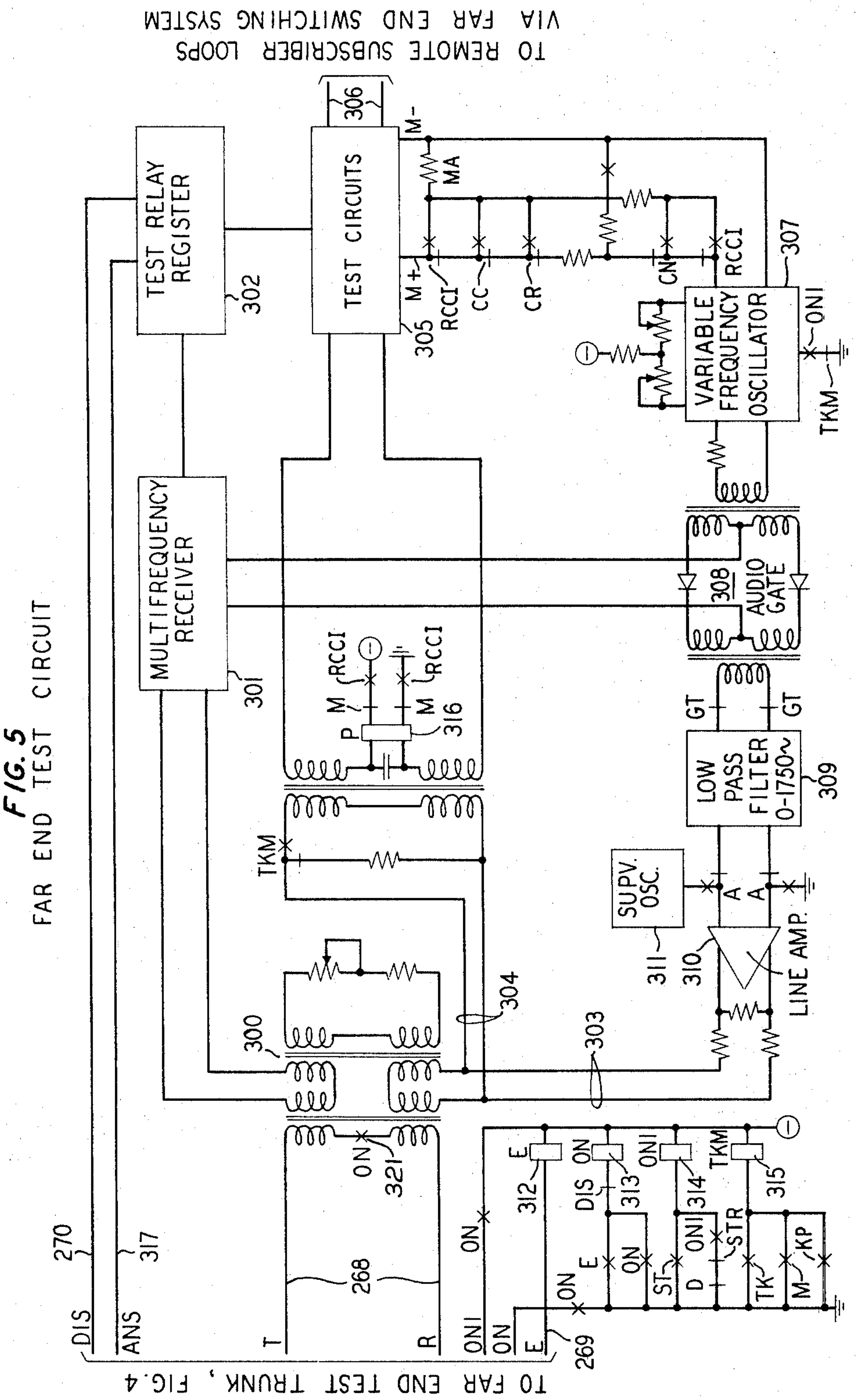

United States Patent Office 3,389,234
Patented June 18, 1968

3,389,234
ACCESS CONTROL IN TELEPHONE TESTING SYSTEMS

J. Arthur Cotner, Elizabeth, N.J., assignor to American Telephone and Telegraph Company, New York, N.Y., a corporation of New York Filed May 27, 1965, Ser. No. 459,389
8 Claims. (Cl. 179—175.2)

ABSTRACT OF THE DISCLOSURE

A secured-access arrangement for a remote local loop telephone testing system is disclosed in which a remotely located operator dials a connection to the testing location which then automatically dials back another connection to the operator over non-dedicated trunking facilities. Remote tests can then be controlled and monitored over the second connection. Unauthorized access is prevented by the dial-back arrangement and hence dedicated trunks are not required.

This invention, relates to telephone testing systems and, more particularly, to the testing of local subscriber loops from remote testing centers.

The maintenance of a modern telephone system requires regular periodic testing of subscribers' lines to insure that customers receive continuous service of good quality. Since a large proportion of local subscriber loops are exposed to weathering, storm damage and vandalism, circuit continuity is often impaired by short circuits, grounding, line crosses and other troubles. These trouble conditions must be detected soon after their occurrence and located so that repairs can be made.

The basic testing of local subscriber loops is accomplished by applying test voltages to the loop conductors and observing the behavior of the current through the loop. Tests of the various functions of the local central office are also possible, as well as special tests for multiparty loops, pay station loops, ringing circuits, and so forth. The results of these tests can be read on a direct current meter connected to the loop.

Heretofore, a Local Test Desk (LTD) has been provided to perform all of the above tests as well as set up the necessary connections. Due to the necessity of providing direct current meter readings for most of these tests, the range over which these tests could be performed is severely limited. Direct current paths must be maintained to the local subscriber loops from the LTD. Moreover, the impedance of these direct current paths must be kept at a very small value to prevent undesired influences on the test readings. As a result, separate LTD's must be provided for each small geographical area, along with all of the attendant control and supervisory equipment. It is necessary, for example, to provide a number of test desks in a single large city where economics would normally dictate centralization of the test functions.

It is a general object of the present invention to extend the range of test facilities for testing local subscriber loops to theoretically unlimited geographical distances.

In order to extend the range of heretofore-proposed subscriber loop test facilities, it is the practice to dedicate a number of inter-exchange test trunks for this purpose and to connect these trunks in parallel. This procedure does lower the resistance of the test facilities themselves to acceptable ranges for smaller distances, but causes a corresponding increase in the capacitance of the test facilities, thus making ballistic type tests difficult or impossible. More importantly, the dedication of large numbers of inter-exchange trunks solely for subscriber loop testing greatly increases the cost of such testing facilities.

It is a further object of the invention to test local subscriber loops over non-dedicated trunking facilities in the commercial telephone network.

In accordance with the present invention, these general objects are achieved by the use of a system of alternating current signals between a test desk and a local exchange which may be as far from the test desk as required. The local test conditions, such as test batteries, grounds and reversals, are provided for by remotely-controlled test facilities which may be identical in most respects to those previously used. The control of these test facilities, however, is achieved by the use of a system of alternating current signals transmitted from the test desk location to the remote location where they are detected and used to control the local test facilities. In a similar fashion, the direct current test readings at the local exchange are transformed into alternating current signals and transmitted back to the test desk to be detected and used to operate a meter.

From the above description, it can be seen that the local test desk facilities for the system of the present invention can be maintained exactly as they have been for previously-used systems. These facilities include a dial, a head set, a direct current meter and a number of control keys to set up the desired tests. The present invention comprises a signaling system which utilizes the direct current outputs of these facilities to generate the required alternating current signals. Similarly, the direct current in the local subscriber loop is used to generate an alternating current signal on which the direct current signal is modulated. In the preferred embodiment, pulses of multifrequency tone are used for supervisory signaling while frequency modulation is used for transmitting the direct current readings.

Turning to a specific aspect of the remote subscriber loop testing system, it can be seen that access to the local exchange over non-dedicated trunking facilities requires that the connection be set up by conventional dialing procedures. This arrangement has the disadvantage, however, of permitting access to the testing circuits for anyone having knowledge of the telephone number assigned to the test circuits.

It is a more specific object of the present invention to limit access to facilities utilizing the commercial telephone network to authorized personnel.

In accordance with this aspect of the present invention, the initial connection set up by the local test desk to the remote testing facilities is maintained only until the remote testing facilities dial back to the local test desk to set up a second connection. All testing then takes place over the second connection. If unauthorized personnel attempts access to the testing facilities, this security call-back arrangement effectively prevents access.

These and other objects and features, the nature of the present invention and its various advantages, will be more readily understood upon consideration of the attached drawings and of the following detailed description of the drawings.

In the drawings:

FIG. 5 is a more detailed block diagram of the far end test circuit shown in FIG. 1.

Figure 1:
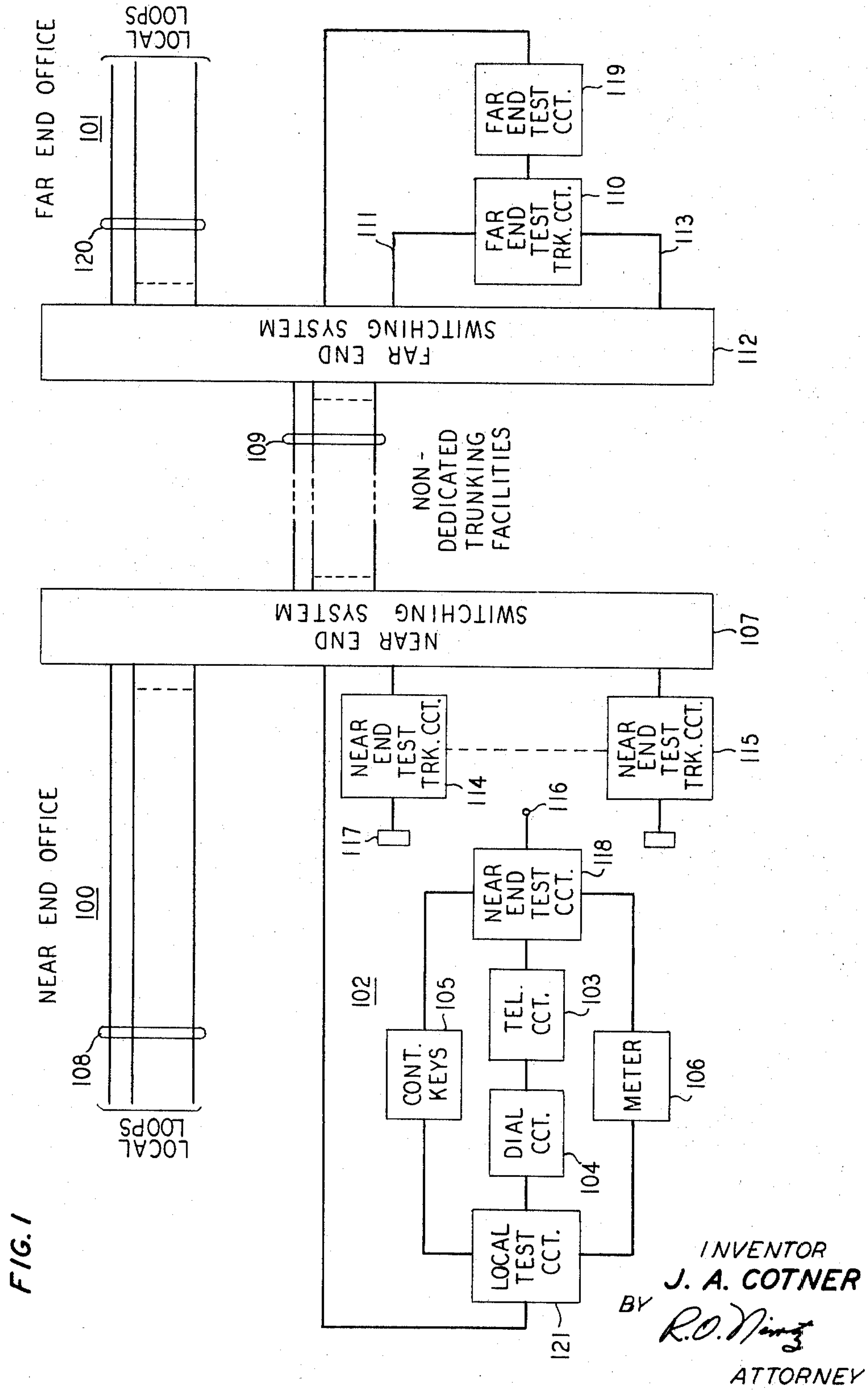
FIG. 1 is a schematic block diagram of the remote subscriber loop testing system of the present invention.

Before proceeding with a detailed description of the drawings, it will be convenient to first take up a convention which has been followed for all of these drawings. This convention, commonly known as the "detached contact" convention, is based on the supposition that relay drawings will be easier to follow if the schematic diagrams do not attempt to associate all the contacts of a relay with the structure which makes or breaks, i.e., closes or opens, these contacts. This supposition is particularly valid when each relay winding controls a large number of contacts which are specifically related to totally different functions. The convention used herein follows the drawing analysis described by F. T. Meyer in "An Improved-Detached Contact Type of Schematic Circuit Drawings," published in Communications and Electronics, No. 20, pp. 505–513, September 1955.

In accordance with this convention, a rectangle represents a relay winding and structure, excepting the contacts actuated by that structure. A set of normally open or make contacts is shown by two short crossed lines through the center of which passes a solid line representing the connecting leads to the set of make contacts. A set of normally closed or break contacts is shown by a short line perpendicular to and across a solid line representing connecting leads to the set of break contacts. A set of transfer contacts, i.e., a movable contact moving from one fixed contact to another fixed contact upon the operation of the relay, is shown by two perpendicular lines, one terminating in the other. A make contact is drawn one one of the lines meeting at the intersection; a break contact is drawn on another of the lines meeting at the intersection; and no contact whatever is drawn on the third line. According to the convention, the lead with no contact representation thereon is transferred from the lead including the break contact to the lead including the make contact upon actuation of the relay.

The capital letters and numerals or combinations thereof appearing adjacent each rectangle identifies the particular relay. Corresponding letters and numerals adjacent to a set of contacts identify these contacts as being operated by a relay bearing the same letters and numerals. Other circuit elements are shown in the usual form.

For ease in reading the drawings, whenever possible, the relays have been shown as operated from a negative voltage source supplying a bus to the right of the relay winding. The ground for this negative voltage source is, whenever possible, represented as a bus to the left of the relay winding. The combinations of make, break, and transfer contacts which complete the energization of a relay winding are shown on conductors extending through the relay winding from the voltage supply bus to the ground bus.

Referring then to FIG. 1, there is shown a general block diagram of a subscriber loop testing system in accordance with the present invention. Since the testing system of the present invention involves the testing of local subscriber loops from remotely located office locations, for the purpose of illustration, two office locations, 100 and 101, have been illustrated in FIG. 1. The near end office 100 includes all of the equipment necessary to initiate subscriber loop tests for subscriber loops at that office and at any one of a number of remote offices. The far end office 101 includes all of the equipment necessary for local subscriber loops at that office to be tested from a remotely located central office. It is to be understood, however, that near end central office 100 is capable of servicing any number of remote central offices and, moreover, may at the same time include facilities for testing its own local subscriber loops from yet another remotely located office. Hence, the equipment illustrated in FIG. 1, represent only the minimum equipment necessary for testing local subscriber loops from remotely located central offices, and is not to be taken in a limiting sense.

Referring then to Local Office 100, there is shown Local Test Desk (LTD) facilities 102 including a standard telephone circuit 103, and an associated dialing circuit 104, along with test control keys 105, and a direct current meter circuit 106. When LTD 102 is engaged in testing a local subscriber loop in near end office 100, the control keys 105 are used to set up the test conditions in local test circuits 121. The results of these tests can then be read on meter 106. The dial circuit 104 is utilized to set up connections to the local subscriber loops through the near end switching system 107.

Switching system 107 may comprise any type of telephone switching system in use for the purpose of setting up telephone connections between subscribers either locally or by way of trunk facilities to remote locations. Such a switching system may, for example, be manual, panel, step-by-step, crossbar, or completely electronic. In any event, the switching system responds to calling signals from the dial circuit 104 to set up the two-way connections between the various appearances at the interface of the switching system and the balance of the telephone network. Thus, a plurality of local subscriber loop circuits 108 is shown connected to switching system 107 along with a plurality of interoffice trunks 109.

When a testman wishes to conduct local subscriber loop tests at a remote office such as far end office 101, the testman utilizes the dial circuit 104 to establish a telephone connection between LTD 102 and the far end office 101 by way of a non-dedicated trunk included in group 109.

At far end office 101, ringing current is then applied to far end test trunk circuit 110 by way of an appearance 111 at the far end switching system 112. Like switching system 107, far end switching system 112 may comprise any type of switching facility available in the telephone plant.

In response to the presence of a ringing signal on appearance 111, far end test trunk circuit 110 automatically initiates the operation of a program-controlled calling device which produces on appearance 113 the telephone number assigned to the initiating test center. These calling signals cause switching system 112 to establish a second connection between far end test trunk circuit 110 through yet another trunk within the group 109 to the near end switching system 107.

A plurality of near end test trunk circuits 114–115 are connected to appearances on switching system 107. Each of near end test trunks 114–115 is assigned to one remotely located central office. The near end test trunk circuit assigned to office 101, for example, near end test trunk circuit 114, is assigned the telephone number which far end test trunk circuit 110 automatically calls over appearance 113. When this connection is established to near end test trunk 114, a supervisory lamp flashes and the testman then inserts a plug 116 into jack 117 to complete the circuit from near end test trunk 114 to near end test circuit 118. At this time, the original connection set up between LTD 102 and far end test trunk circuit 110 is taken down and appearance 111 is made busy.

The testman at LTD 102 may now proceed to set up the local loop tests by means of the dial circuit 104 and control keys 105 in the same manner that such tests are set up for local subscriber loops. Near end test circuit 118, however, translates these key operations into multifrequency signals which are transmitted by way of near end test trunk circuit 114, trunking facilities 109, and far end test trunk circuit 110 to the far end test circuit 119. At far end test circuit 119, the multifrequency signals are received, detected, decoded, and utilized to operate relays to set up the appropriate test conditions in far end test circuit 119 at far end office 101.

Direct current levels appearing at far end test circuit 119 are translated to frequency-modulated waves and transmitted, via the non-dedicated facilities and near end test trunk circuit 114, to near end test circuit 118. Here these FM signals are demodulated and the resulting direct current signals applied directly to meter circuit 106.

The testman may use the dial circuit 104 to set up test connections to as many local subscriber loops in far end office 101 as are desired without releasing the connection between near end test circuit 118 and far end test circuit 119. When these tests are completed, the operation of an appropriate key serves to release all the test connections and return these circuits to normal. Thereafter, other similar connections to other remote offices may be set up and tests conducted in the same way.

It can be seen from the description of FIG. 1 that the present invention provides a means for testing local subscriber loops in remote office locations with no more difficulty than similar tests performed on subscriber loops in the local office. Moreover, since all of the signals transmitted between the central office locations are translated to alternating current signals within the voice frequency band, all of the available trunking facilities, including wire pairs, carrier systems, coaxial, microwave, submarine cable or even satellite channels can be used with equal facility. In addition, there is no limit on the geographic separation of these two central offices since all that is required in the way of transmission facilities between the locations is the normal speech path provided for ordinary telephone conversations.

Figure 2:
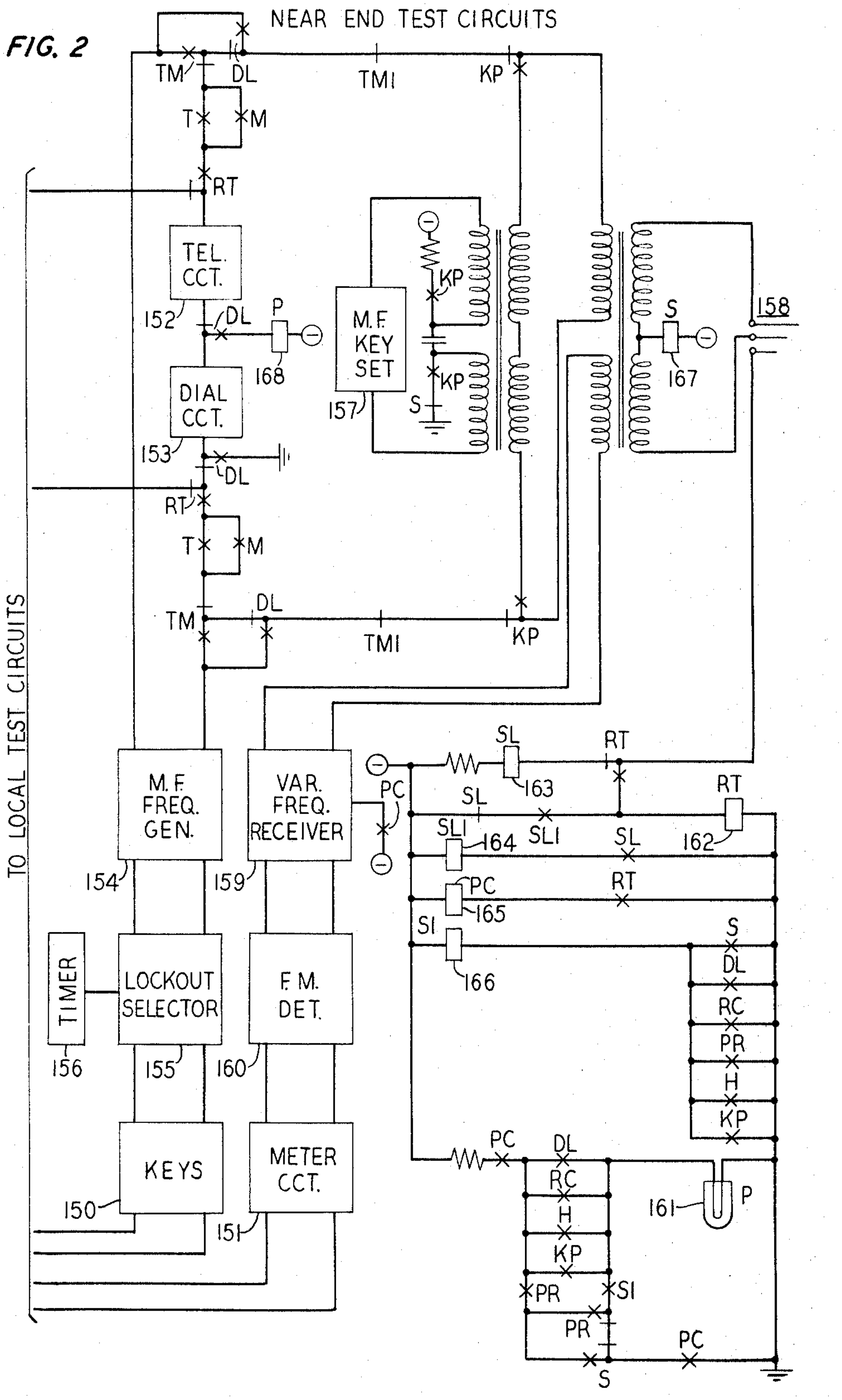
FIG. 2 is a more detailed block diagram of the near end test circuits shown in FIG. 1.

In FIG. 2 there is shown a more detailed block diagram of the near end test circuit 118 shown in FIG. 1. The near end test circuit of FIG. 2 comprises the key control circuit 150, corresponding to the control keys 105 in FIG. 1; the meter circuit 151, corresponding to meter 106 in FIG. 1; and the telephone circuit 152 and dial circuit 153, corresponding to 103 and 104, respectively, in FIG. 1. In addition, a multifrequency code generator 154 is provided to translate the key operations in key control circuit 150 into multifrequency codes.

As is well understood, for such a multifrequency code to be accurately detected at a remote location, it is necessary that this code be transmitted for at least a minimum duration. It is desirable, however, that the testman operating the keys in key control circuit 150 not be required to wait for the termination of this transmission period between successive operations of the keys. To make this possible, a lockout selector 155 is provided which selects, on a random basis, one of the key operations in key control circuit 150, signals this particular function by way of multifrequency code generator 154 for the prescribed timed interval, as indicated by timing circuit 156, and meanwhile locks out all of the other keyed signals.

At the termination of the timed interval, indicated by timer 156, lockout selector 155 terminates the transmission of that particular multifrequency code, opens the lockout circuit and again selects at random one of the remaining key operations. These successive random selections continue until all of the key operations called for have ben handled. Lockout selector 155 then waits for a new request for service.

Since connections to some central office locations are better controlled by multifrequency code pulses rather than direct current dial pulses, a multifrequency key set 157 is also provided to allow the testman to set up connections by means of multifrequency key pulse codes.

The near end test circuit of FIG. 2 is provided with the conventional telephone plug 158 (corresponding to plug 116 in FIG. 1) which is used to connect the test circuit of FIG. 2 to a near end test trunk as illustrated in FIG. 1.

The near end test circuit of FIG. 2 also includes facilities for receiving meter readings which are frequency-modulated in the voice frequency band. These signals are received by variable frequency receiver 159 where they are amplified and applied to a frequency-to-voltage transducer 160. The output of transducer 160 corresponds precisely to the original direct current to be metered and is applied to meter circuit 151.

A supervisory lamp 161 is also provided to give lamp signals to the testman. The control circuits for the supervisory lamp 161, as well as the control of relays 162 through 168, will be described hereinafter in connection with the description of the operation of the overall system.

Figure 3:
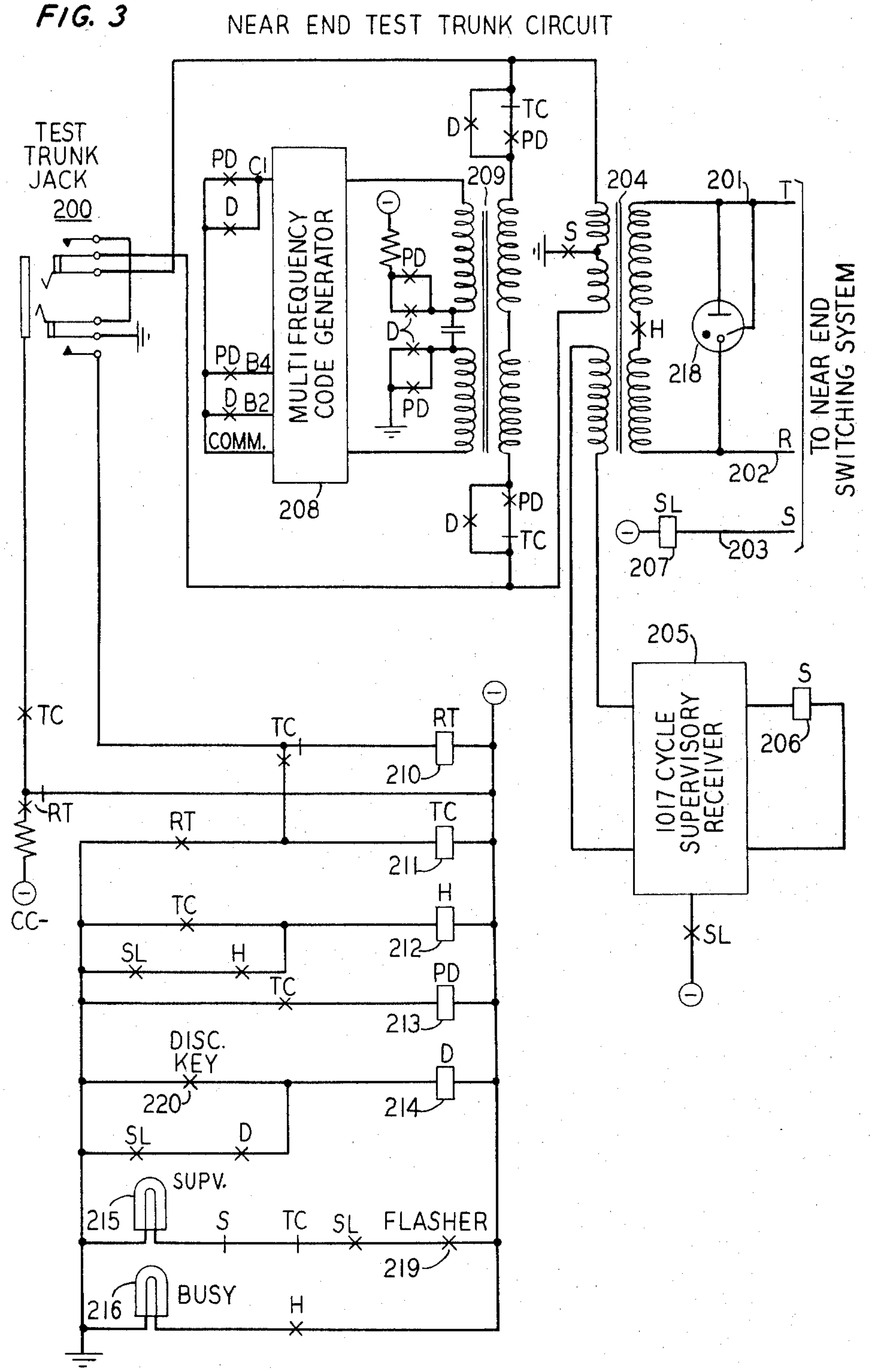
FIG. 3 is a more detailed block diagram of the near end test trunk circuit shown in FIG. 1.

In FIG. 3 there is shown a more detailed block diagram of a near end test trunk circuit such as circuits 114 and 115 in FIG. 1. The near end test trunk circuit of FIG. 3 comprises a test trunk jack 200 (corresponding to jack 117 in FIG. 1) into which the plug 158 of FIG. 2 may be inserted. FIG. 3 also shows conductors 201, 202, and 203 which are the tip, ring and sleeve conductors, respectively, of one appearance on the near end switching system 107 of FIG. 1. The tip and ring conductors 201 and 202 are connected to a transformer 204 having two secondary windings. One of these windings is connected directly to test trunk jack 200. The other secondary winding is connected to supervisory signal receiver 205 which, in turn, operates Supervisory relay 206. Sleeve conductor 203 is connected to Sleeve relay 207 in such a manner that a ground appearing on sleeve conductor 203 operates SL relay 207.

A multifrequency code generating circuit 208 is connected across the secondary winding of transformer 209. The primary winding of transformer 209 is connected directly across the first one of the secondary windings of transformer 204. A plurality of control relays 210 through 214 is also provided in the near end test trunk circuit of FIG. 3 and are used in the manner to be hereinafter described.

A supervisory lamp 215 and a busy lamp 216 are likewise provided in the near end test trunk circuit of FIG. 3 for the purpose of indicating certain conditions for the attendant personnel. The detailed operation of the near end test circuit of FIG. 3 will be described more fully hereinafter in connection with the description of the overall operation of the system.

Figure 4:
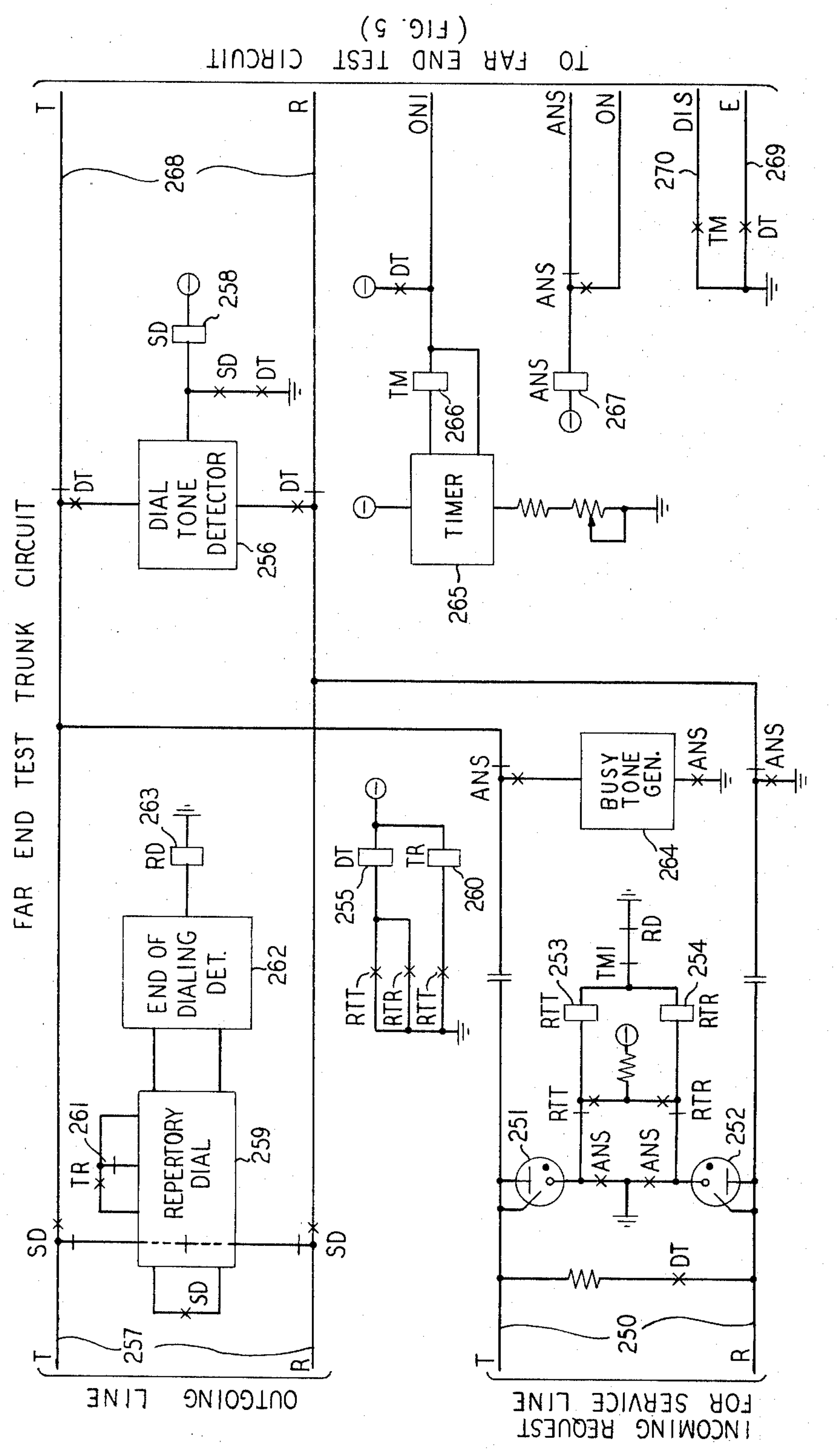
FIG. 4 is a more detailed block diagram of the far end test trunk circuit shown in FIG. 1.

In FIG. 4 there is shown a more detailed circuit diagram of the far end test trunk circuit shown as element 110 of FIG. 1. The circuit of FIG. 4 comprises an incoming "request for service" line 250 which is connected to far end switching system 112 (corresponding to line 111 in FIG. 1), and to which there is assigned the telephone number or numbers to be dialed when access is desired to the remote testing equipment. In the circuits of FIG. 4, line 250 is arranged as a two-party line and assigned two separate numbers. This allows access to the remote testing equipment from two different test locations. To this end, a pair of gas-filled tubes 251 and 252 are connected between the tip and ring conductors, respectively, of line 250, through a respective one of relays 253 and 254, to ground. In operation, a ringing signal with superimposed battery applied between the tip conductor of line 250 and ground breaks down gas tube 251 to operate Ringing Trip-Tip relay 253. Similarly, a ringing signal appearing between the ring conductor 250 and ground breaks down gas tube 252 to operate Ringing Trip-Ring relay 254. The operation of either of relays 253 or 254 operates Dial Tone relay 255 to connect dial tone detector 256 across the outgoing line appearance 257. DT relay 255 also places a ground on lead 269 to the far end test circuit, taking this circuit off-normal and causing line 268 to be bridged by one winding of a hybrid coil 300 (FIG. 5). Line 257 is therefore seized at the far end central office and dial tone placed thereon.

Once a dial tone signal is detected across line 257, dial tone detector 256 causes Start Dial relay 258 to operate, initiating the operation of an automatic repertory dial 259. The repertory dial 259 is of the type into which at least two different telephone numbers may be programmed such that the enablement of the dial by the SD contacts shown will cause the dial to generate the appropriate sequences of dial pulses for calling the required number. This number, of course, corresponds to the originating test station. Such an automatic dial is, for example, shown in the copending application of H. J. Hershey et al., Ser. No. 459,861, filed May 28, 1965.

RTT relay 253 closes an operate path for Transfer relay 260 which, in turn, operates TR contacts 261. Contacts 261, illustrated in FIG. 4 as a single set of transfer contacts, in fact comprises a plurality of such transfer contacts and serves to rearrange the programming of repertory dial 259 to provide for calling a second telephone number. This second telephone number corresponds to a second testing station which may obtain access to the trunk circuit of FIG. 4 by way of the telephone number assigned to the tip conductor of conductors 250.

When repertory dial 259 has completed the generation of the required dial pulse sequences, a signal is applied to the end-of-dialing detector 262 which, in turn, operates Release Dial relay 263. RD relay 263, when operated, releases RTT relay 253 which, in turn, releases DT relay 255 and TR relay 260. DT relay 255, in releasing, releases SD relay 258, while TR relay 260 releases TR contacts 261. The receiving portion of the far end test trunk circuit of FIG. 4 is now returned to normal.

A busy tone signal generator 264 is provided to place a busy tone on line 250 following the establishment of the second connection by way of conductors 257. A time-out timer 265 is also provided to operate Timer relay 266 after a timed interval following the operation of DT relay 255. If the second connection, by way of line 257, is not completed within the time-out period of timer 265, the operation of TM 266 releases all of the circuits of FIG. 4, and initiates a disconnect signal for transmission back to the near end test trunk circuit by way of line 270.

An Answer relay 267 is also provided to register the reception of a confirmation signal from the near end central office, indicating that the second connection, established by way of line 257, has been completed. A more detailed description of the operation of the control circuits of FIG. 4 will be taken up hereinafter in connection with the detailed description of the overall operation of the system.

In FIG. 5 there is shown the far end test circuit corresponding to circuit 119 in FIG. 1. The incoming line 268 is connected directly to the corresponding line in FIG. 4. In FIG. 5 this line connects to a hybrid circuit 300, one leg of which includes a multifrequency receiver 301 followed by a test relay register 302. The conjugate leg of hybrid 300 has connected thereto a pair of conductors 303 in parallel with a second pair of conductors 304.

The pair of conductors 303 carry frequency-modulated signals which represent the magnitude of a test current supplied from a local subscriber loop. Conductors 304, on the other hand, carry normal speech currents from the local subscriber loop and may be used for monitoring these loops.

In general, multifrequency control signals sent from the near end central office are received by multifrequency receiver 301 and used to operate appropriate relays in test relay register 302. These relays, in turn, set up the appropriate test conditions in test circuit 305, connected between line 306 and conductors 304. Line 306, of course, is connected, by way of the far end switching spstem, to the far end subscriber loop.

Currents are induced in the far end subscriber loop as a result of the various test conditions and are applied to variable frequency oscillator 307. Oscillator 307 translates the variable level direct current into a signal the frequency of which varies in a narrow range within the voice frequency band. These frequency-modulated signals are applied, by way of a gate circuit 308, to a low-pass filter 309. These signals are then passed through a line amplifier 310 and conductor 303 to hybrid circuit 300. Audio gate 308 serves to block FM signals when multifrequency receiver 301 is receiving a multifrequency code. This prevents the unwanted FM signals from entering receiver 301 by way of hybrid circuit 300.

A supervisory oscillator 311 is connected between low-pass filter 309 and line amplifier 310. Oscillator 311 provides customer line supervision and generates the supervisory signals which are detected by the supervisory receiver 205 in FIG. 3. A plurality of control relays 312 through 316 are also provided for various control functions. These relays, together with other details of the circuit of FIG. 5, will be described hereinafter in connection with the description of the overall operation of the system.

The general operation of the remote subscriber loop testing system disclosed in FIGS. 2 through 5, will now be described. The operation is initiated by the testman at the near end test circuits who utilizes dial circuit 153 (FIG. 2) to call the telephone number assigned to the far end central office test circuits. This call is completed by way of local test circuit 121 and the near end switching system 107 (FIG. 1). Moreover, this connection is established over non-dedicated trunking facilities which at other times may be used for commercial telephone traffic.

Referring now to FIG. 4, the telephone number dialed by the testman at the near end office causes the far end switching system 112 (FIG. 1) to provide a ringing signal with superimposed battery on line 250. Depending on the source of this call, ringing signals may appear between the tip conductor and ground or between the ring conductor and ground. This ringing voltage breaks down one of gas tubes 251 or 252, depending on whether the called telephone number is assigned to the tip or ring conductor.

Assuming for the moment that ringing appears between the tip conductor of line 250 and ground, gas tube 251 breaks down to operate RTT relay 253. In operating, RTT relay 253 locks to a local battery. In addition RTT relay 253 operates make contacts in the operate path of DT relay 255 and operates TR relay 260. DT relay 255, when operated, connects dial tone detector 256 to the outgoing line 257. The bridging of line 268 by ON contacts 321 (FIG. 5) causes the seizure of line 257 at the far end switching office and the application of dial tone to this line. When this dial tone is detected by the detector 256, SD relay 258 operates, locking to make contacts of DT relay 265.

In operating, SD relay 258 operates starting contacts on a repertory dial 259. Meanwhile, TR relay 260 has adjusted the program of repertory dial 259, by the operation of TR contacts 261, such that repertory dial 259 automatically calls the telephone number assigned to the originating test desk.

When repertory dial 259 has completed the pulsing of this telephone number into the far end switching system, end-of-dialing detector 262 is energized to operate RD relay 263. RD relay 263, in operating, releases RTT 253 by way of the break contacts in the operate path of this relay.

The far end test trunk circuit of FIG. 4 must now await the confirmation of the completion of the second connection to the near end central office. DT relay 255, when operated, also initiates a timing cycle in timer 265 and provides a ground on lead 269 to the far end test circuit of FIG. 5. This ground takes the far end test circuit of FIG. 5 off-normal and prepares it for the reception of the above-mentioned confirmation signal from the near end test desk.

The timer 265 is arranged to operate TM relay 266 after the termination of the timed interval, for example, 100 seconds. This interval is a time-out interval for the operation of the repertory dial 259. Should the repertory dial fail to out-pulse the desired number within this time interval, TM relay 256 operates to release RTT relay 253 and thence DT relay 255, TR relay 260, and SD relay 258, returning the circuits of FIG. 4 to normal. In addition, TM relay 266 provides a ground on lead 270 to the far end test circuit of FIG. 5 to initiate a disconnect of the far end test circuit.

Turning new to FIG. 3, the number called by repertory 259 causes the near end switching system to place a ringing signal between conductors 201 and 202. A gas-filled tube 218 breaks down and trips this ringing. At the same time that ringing is applied to conductors 201 and 202, the near end switching system provides a ground on sleeve lead 302 to operate SL relay 207. In operating, SL relay 207 enables supervisory receiver 205 and closes the conductor between the supervisory lamp 215 and the flasher contacts 219. The supervisory lamp 215 therefore begins to flash to alert the testman that the second connection has been completed from the far end testing circuit.

Turning to FIG. 2, in reply to the flashing of the supervisory lamp of the near end test trunk circuit, the testman inserts plug 158 into test trunk jack 200. When the plug 158 is thus placed in jack 200, an operate path is completed for RT relay 210 (FIG. 3) which operates and provides a operate path for TC relay 211. TC relay 211, when operated, opens the flashing path for supervisory lamp 215, thus extinguishing this lamp, and also transfers the operate path of RT relay 210 to its own winding. During the interval after TC relay 211 has operated, but before RT relay 210 is released, a pulse of CC-battery is applied over the sleeve lead of jack 200 to the near end test circuit of FIG 2. This will be taken up hereinafter.

In operating, TC relay 211 also operates H relay 212 which locks to make contacts on SL relay 207. H relay 212, when operated, lights busy lamp 216 and provides a low impedance path between line conductors 201 and 202. TC relay 211 also operates PD relay 213 which, when operated, enables multifrequency code generator 208 to send the position disconnect signal. The multifrequency code generator 208, however, is not connected to the line circuit until break contacts of TC relay 211 are closed, indicating that the plug has been removed from the test trunk jack 200.

A Disconnect relay 214 is operated by a disconnect key 220 when it is desired to disconnect the remote testing circuits without removing the plug from jack 200. When operated, D relay 214 locks to make contacts on SL relay 207. D relay 214 also enables multifrequency code generator 208 to send a disconnect code to the remote testing circuits. Moreover, make contacts on D relay 214 provide a bridge to connect code generator 208 to the line.

Returning to FIG. 2, the pulse of CC-battery on the sleeve of jack 200 operates SL relay 163 in the near end test circuits of FIG. 2. SL relay 163, when operated, completes an operate path for SL1 relay 164. When the pulse of CC-battery terminates, SL relay 163 releases to complete the operate path for RT relay 162. RT relay 162 transfers the sleeve conductor from SL relay 163 to its own winding and remains operated as long as plug 158 remains in jack 200.

In operating, RT relay 162 completes an operate path for PC relay 165. RT relay 162 also transfers the telephone circuit 152 and dial circuit 153 from the local test circuits to plug 158. PC relay 165 enables variable frequency receiver 159 and connects signal lamp 161 to operate and shunt conductors.

In FIG. 3, S relay 206 provides a ground for operating S relay 167 in FIG. 2 over a simplex signaling circuit through plug 158 and jack 200. S relay 167 in FIG. 2 completes an operate path for S1 relay 166. S1 relay 166, together with S relay 167, prepares a shunting path around signal lamp 161.

The operation of PC relay 165 initiates the transmission from multifrequency code generator 154 of the confirmation signal referred to above. This signal is transmitted by way of the near end test trunk circuit of FIG. 3, the near end switching system, and the far end switching system, over the connection established by the repertory dial, to line 257 in FIG. 4. This code is transferred by the far end test circuit of FIG. 5 to the multifrequency receiver 301 where it is decoded and used to operate a control relay in register 302 which provides a ground on lead 317. This ground operates Answer relay 267 (FIG. 4). ANS relay 267, when operated, shorts out relays 253 and 254 to prevent another test position from gaining access to the remote testing circuit of FIG. 5. ANS relay 267 also connects busy tone generator 264 (FIG. 4) to line 250 to mark this access line as busy. The circuits are now prepared for use in actual tests.

To this end, the testman operates a DIAL key in key circuits 150 (FIG. 2) along with keys to indicate the test trunks to be used at the far end office 101 (FIG. 1). The testman may then dial the subscriber lines to make the actual connection thereto. Finally, the test keys are operated to set up the desired test conditions. The details of this operation are disclosed in the copending application of C. R. Davies, Ser. No. 459,396, filed of even date herewith.

In the manner described above, tests may be performed on local subscriber loops at the far end central office from a test position located in the near end test central office. All these tests are carried on over the second connection set up by the repertory dial at the far end central office. Since this connection can only be set up between the two central office test positions, unauthorized access to the test circuits is impossible. Thus, the arrangements of the present invention permit the use of non-dedicated transmission facilities for testing purposes without the problem of unauthorized access to the circuits. Such an arrangement greatly reduces the cost of testing facilities and, moreover, allows the economical concentration of attended test positions at a few centrally located places.

It is to be understood that the above-described arrangements are merely illustrative of the numerous and varied other arrangements which may constitute applications of the principles of the invention. Such other arrangements may readily be devised by those skilled in the art without departing from the spirit or scope of this invention.

What is claimed is:

1. A remote testing system comprising, a controlling station and a controlled station, telephone calling means at said controlling station for extending a first connection from said controlling station to said controlled station, automatic telephone calling apparatus at said controlled station, means responsive to the establishment of said first connection for enabling said automatic telephone calling apparatus, said automatic telephone calling apparatus, when enabled, extending a second connection from said controlled station to said controlling station, means responsive to the completion of said second connection for terminating said first connection, and means for conducting tests over said second connection.

2. A remote testing system according to claim 1 wherein said first connection includes a multiple-access connection at said controlled station, and means selectively responsive to each particular access to said multiple-access connection for modifying said automatic telephone calling apparatus to extend a different second connection from said controlled station.

3. A telephone communication system using non-dedicated facilities while preventing unauthorized access comprising, a first and a second station, means at said first station for extending a first connection from said first station to said second station, means at said second station responsive to the establishment of said first connection for extending a second connection from said second station to said first station, and means responsive to the establishment of said second connection for taking down said first connection.

4. A limited access communication system using unreserved transmission facilities comprising, at least two stations, means at one of said stations for establishing a first connection between said two stations over said common transmission facilities, means at the other of said stations for establishing a second connection between said two stations over said common transmission facilities in response to the establishment of said first connection, and means responsive to the establishment of said second connection for terminating said first connection.

5. A remote control system comprising, at least one controlling station, at least one controlled station, means at said controlling station for initiating a first connection to said controlled station through conventional telephone facilities, means at said controlled station responsive to the completion of said first connection for initiating a second connection to said controlling station through conventional telephone facilities, and means responsive to the completion of said second connection for terminating said first connection and for enabling the control of said controlled station by said controlling station over said second connection.

6. A remotely controlled testing system for telephone subscriber lines comprising testing apparatus at a first central office connected to said subscriber lines, test control means at a remotely located second central office, means at said second central office for dialing a first connection to said first central office, means at said first central office responsive to ringing signals on said first connection for dialing a second connection to said second central office, means responsive to the establishment of said second connection for terminating said first connection, and means included in said test control means for controlling said testing apparatus over said second connection.

7. The remotely controlled testing system according to claim 6 wherein said testing apparatus includes a multiparty line appearance, said first connection being established to said multiparty line appearance, means selectively responsive to different ones of a plurality of party line ringing signals on said multiparty line appearance for dialing said second connection to respectively different test control means.

8. The remotely controlled testing system according to claim 6 wherein said remotely located central office includes means for selectively connecting said test control means to any one of a plurality of different ones of said second connections.

References Cited

UNITED STATES PATENTS

| | | | |
|---|---|---|---|
| 1,570,741 | 1/1926 | Harden | 179—175.3 |
| 3,301,961 | 1/1967 | Odom | 179—18 |

KATHLEEN H. CLAFFY, *Primary Examiner.*

A. A. McGILL, *Assistant Examiner.*